UNITED STATES PATENT OFFICE.

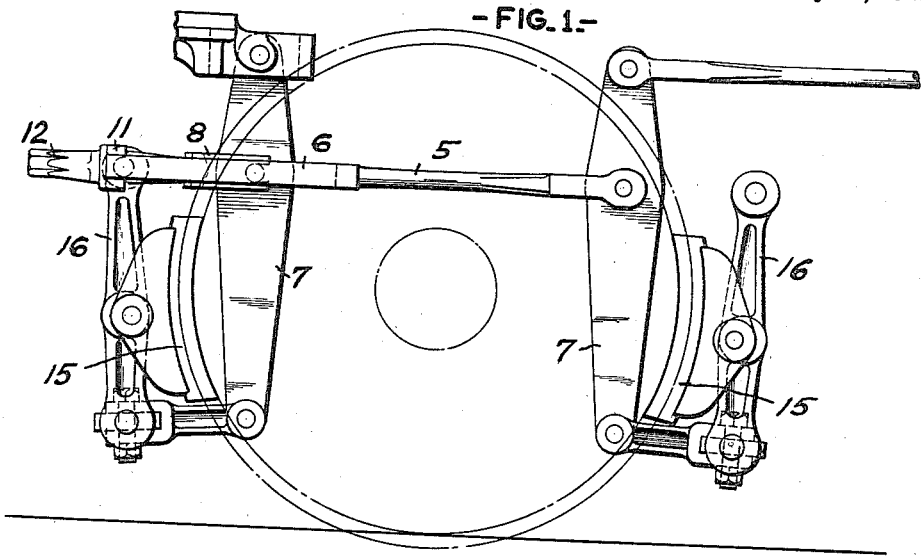
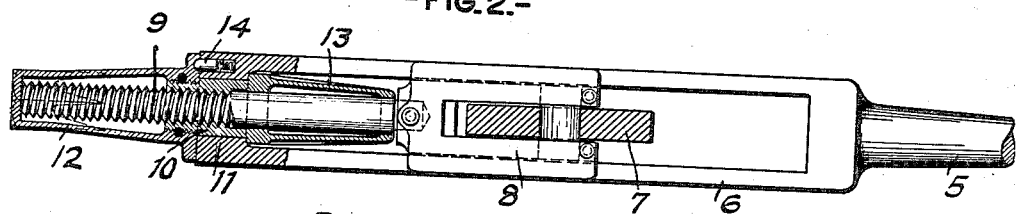
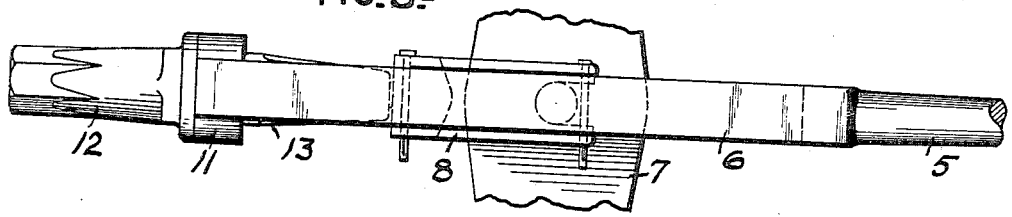
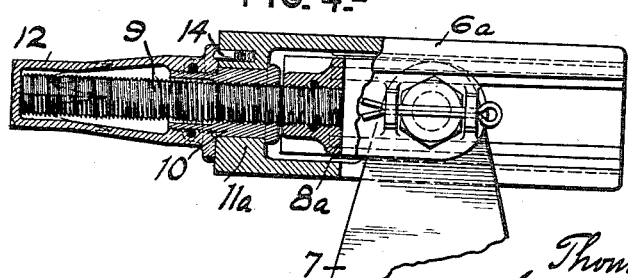

THOMAS L. BURTON, OF ST. LOUIS, MISSOURI, ASSIGNOR TO THE AMERICAN BRAKE COMPANY, OF ST. LOUIS, MISSOURI, A CORPORATION OF MISSOURI.

BRAKE SLACK-ADJUSTER.

1,235,286.     Specification of Letters Patent.     Patented July 31, 1917.

Application filed February 17, 1916. Serial No. 78,812.

*To all whom it may concern:*

Be it known that I, THOMAS L. BURTON, of St. Louis, in the State of Missouri, have invented a certain new and useful Improvement in Brake Slack-Adjusters, of which improvement the following is a specification.

This invention relates to devices for taking up the slack in railway brake rigging, and has for its object to provide a simple manually operated screw mechanism for adjusting the connection between a lever and rod of the brake rigging, or for shifting the fulcrum of a dead truck lever for the purpose of eliminating the slack caused by the wear of the brake shoes, and the wear and lengthening of the members of the brake rigging.

With this object in view, my invention comprises an improved means for protecting the screw from dirt and dust, and for manually operating the same.

In the accompanying drawing: Figure 1 is a side elevation of a portion of the brake rigging, and showing my improved adjuster mechanism applied to the connection between one of the truck levers and a tie rod; Fig. 2, a horizontal section of one form of adjuster embodying my improvement; Fig. 3, a side elevation of the same; and, Fig. 4, a vertical section showing a slightly modified construction applied to the fulcrum of a dead truck lever.

According to the construction shown in Figs. 1, 2 and 3 of the drawing, one of the tie rods, 5, of the brake rigging is provided with a slotted end forming a frame, 6, having a vertical opening for the truck lever, 7, the side members of the frame forming guides for the fulcrum block, 8, on which said lever is pivoted. The fulcrum block is attached to the end of the screw, 9, passing through the nut, 10, rotatably mounted in the end piece, 11, of the frame, the nut being provided with a hollow exterior extension, 12, for inclosing the screw and also serving as a means for manually turning the nut for adjusting the position of the screw and the fulcrum block. The nut also has an inwardly projecting hollow extension, 13, inclosing a blank portion of the screw adjacent to the fulcrum block, when the screw is in the position indicated in Fig. 2, this being for the purpose of protecting the threaded portion of the screw when the same is adjusted to its inward position. A spring actuated detent, 14, may be mounted in the end of the frame for engaging recesses in the rotatable nut, and serve as an impositive stop for holding the nut and screw in any position to which it may be adjusted.

The brake rigging may be of any suitable or preferred design, comprising brake shoes, 15, hangers, 16, truck levers, 7, rods, 5, etc., and when new shoes are inserted, the screw, 9, will be adjusted to its outer position as shown in Fig. 2. As the slack increases due to the wear of the brake shoes and rod connections, the brake shoes will fall farther away from the wheels when released, and a longer travel of the brake cylinder piston will be required to apply the shoes to the wheels. This diminishes the efficiency of the brake system, and to eliminate this objectionable slack in the brake rigging, the adjusting nut, 10, is then manually rotated to adjust the screw and shift the fulcrum block forward. This operation is repeated as often as necessary until the brake shoes are completely worn out, at which time the threaded portion of the screw, 9, will have traveled forward so as to be mostly within the hollow extension, 13, of the adjusting nut. It will thus be seen that the screw is protected at all times from dirt and dust, either by the hollow extension, 12, or the extension, 13, and that said nut may be readily adjusted manually by turning the extension, 12.

In the modification shown in Fig. 4, the frame, 6$^a$, is secured upon the truck frame and carries the slidable fulcrum block, 8$^a$, to which the dead truck lever, 7, is pivoted. The nut, 10, for the screw, 9, is rotatably mounted in the end, 11$^a$, of the frame in substantially the same manner as before described, the hollow extension, 12, covering the end of the screw. The inward extension shown in the other figures is not, however, employed in this construction, since the frame, 6$^a$, is closed at the top so that it serves as a protection to exclude the dirt and dust from the screw threads when the screw is adjusted to its inner position.

Having now described my invention, what I claim as new and desire to secure by Letters Patent is:

1. In a brake slack adjuster, the combination of a frame, a fulcrum block slidably mounted thereon, a nut rotatably mounted in the end of the frame, a screw attached to said fulcrum block and passing through the nut, a hollow extension from said nut inclosing the end of the screw and serving as a means for manually adjusting the same, and a spring actuated detent on the end of said frame and engaging said nut as an impositive stop.

2. In a brake slack adjuster, the combination of a frame, a fulcrum block slidably mounted thereon, a nut rotatably mounted in the end of the frame, a screw attached to said fulcrum block and passing through the nut, and a hollow extension on said nut extending inward from the nut toward the fulcrum block and surrounding the screw.

3. In a brake slack adjuster, the combination of a frame, a fulcrum block slidably mounted thereon, a nut rotatably mounted in the end of the frame, a screw attached to said fulcrum block and passing through the nut, a hollow extension of the nut inclosing the end of the screw, and another hollow extension covering the screw in the opposite direction.

4. In a brake slack adjuster, the combination of a frame having a vertical opening and a fulcrum block slidably mounted therein, a screw attached to said block, and a nut rotatably mounted in the frame and having a hollow extension inclosing the end of the screw outside the frame, and another hollow extension covering the screw inside the frame.

In testimony whereof I have hereunto set my hand.

THOMAS L. BURTON.